(12) United States Patent
Lambert et al.

(10) Patent No.: US 8,499,178 B2
(45) Date of Patent: *Jul. 30, 2013

(54) SYSTEM AND METHOD FOR MANAGING INFORMATION HANDLING SYSTEM POWER SUPPLY CAPACITY UTILIZATION BASED ON LOAD SHARING POWER LOSS

(75) Inventors: Timothy M. Lambert, Austin, TX (US); Jaydev Reddy, Austin, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,342

(22) Filed: Jan. 30, 2012

(65) Prior Publication Data

US 2012/0137149 A1    May 31, 2012

Related U.S. Application Data

(63) Continuation of application No. 12/200,020, filed on Aug. 28, 2008, now Pat. No. 8,132,034.

(51) Int. Cl.
*G06F 1/00* (2006.01)
(52) U.S. Cl.
USPC ........................................... 713/300
(58) Field of Classification Search
USPC .................................. 713/300, 330
See application file for complete search history.

(56) References Cited

U.S. PATENT DOCUMENTS

| | | | |
|---|---|---|---|
| 5,604,662 | A | 2/1997 | Anderson et al. |
| 5,646,509 | A | 7/1997 | Berglund et al. |
| 5,834,925 | A | 11/1998 | Chesavage |
| 5,913,926 | A | 6/1999 | Anderson et al. |
| 6,121,693 | A | 9/2000 | Rock |
| 6,127,814 | A | 10/2000 | Goder |
| 6,477,291 | B1 | 11/2002 | Ramadas |
| 6,594,771 | B1 * | 7/2003 | Koerber et al. ............... 713/330 |
| 6,661,671 | B1 | 12/2003 | Franke et al. |
| 6,836,353 | B1 | 12/2004 | Ramadas et al. |
| 6,950,895 | B2 | 9/2005 | Bottom |
| 7,593,747 | B1 * | 9/2009 | Karam et al. ................. 455/522 |
| 7,817,917 | B1 | 10/2010 | Shimamoto et al. |
| 7,843,150 | B2 | 11/2010 | Wang et al. |
| 2010/0141282 | A1 | 6/2010 | Heath et al. |

* cited by examiner

*Primary Examiner* — Mohammed Rehman
(74) *Attorney, Agent, or Firm* — Terrile, Cannatti, Chambers & Holland, LLP; Robert W. Holland

(57) ABSTRACT

An information handling system having plural processing modules, such as an information handling system blade chassis having plural information handling system blades, allocates power by determining an actual load sharing power loss associated with plural power supplies and applying the actual load sharing power loss to determine how much power to allocate to the information handling system modules. A chassis manager determines actual load sharing power loss by retrieving power information from plural power supplies. The actual load sharing power loss replaces a worst-case load sharing power loss assumed value to increase the amount power available for allocation to the information handling system modules.

12 Claims, 5 Drawing Sheets

SYSTEM AND METHOD FOR MANAGING INFORMATION HANDLING SYSTEM POWER SUPPLY CAPACITY UTILIZATION BASED ON LOAD SHARING POWER LOSS

CROSS REFERENCE TO RELATED APPLICATIONS

This application is a continuation of application Ser. No. 12/200,020, filed Aug. 28, 2008, now U.S. Pat. No. 8,132,034, which is hereby incorporated by reference in its entirety.

BACKGROUND OF THE INVENTION

1. Field of the Invention

The present invention relates in general to the field of information handling system power supply, and more particularly to a system and method for managing information handling system power supply capacity utilization.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have grown more powerful over time, the infrastructure that supports operation of the information handling systems have had to adapt to increased power consumption. For example, central processor units (CPUs) that perform greater numbers of calculations per time unit typically consume more power than less-powerful counterparts. In addition to the power consumption increase tied to the greater number of calculations, more powerful CPUs also typically produce greater amounts of heat as a byproduct of their operation. The increased thermal energy generally calls for the use of more powerful cooling fans to keep the information handling system within a desired operating range. One approach to address greater infrastructure needs is to support multiple information handling systems within a common chassis that has shared infrastructure. For example, blade servers typically support multiple blades in a common chassis with the blades sharing cooling and power resources under the management of a chassis management controller (CMC). Efficiencies often result when infrastructure is shared, especially where a single hardware device supports multiple information handling systems so that fewer hardware devices are needed and overall cost is reduced. For example, a blade chassis might have three power supplies shared between a dozen blades using a power budget managed by the CMC.

One difficulty that arises when multiple power supplies are used in a system is that some available power is lost when the power load is shared across multiple power supplies. The actual power available to the system is the sum of the power supplied by the individual power supplies corrected for system factors, such as efficiency and system overhead, minus the power lost to the load sharing mechanism, known as the load sharing power loss. In order to prevent any one power supply from exceeding its capacity, information handling systems typically assume a worst case load sharing power loss based on the actual power supplies when setting the system's power budget. For example, a worst case load sharing power loss might reflect extremes of the possible power distribution that covers 99.5% of the entire population of available power supplies. Thus, in actual systems, the actual load sharing power loss is designed to be much lower than the worst case numbers that are assumed to create the power budget. However, using worst case assumptions to generate a power budget typically means that some of the available capacity of the power supplies goes unused. Where the available power supply capacity is close to the expected demand of information handling systems that use the power, the system is typically loaded with more expensive power supplies that have greater capacity or operated with less expensive power supplies at reduced levels that consume less power.

SUMMARY OF THE INVENTION

Therefore a need has arisen for a system and method which measures actual load sharing power loss associated with multiple power supplies for improved power supply capacity utilization.

In accordance with the present invention, a system and method are provided which substantially reduce the disadvantages and problems associated with previous methods and systems for managing power supply capacity utilization. Actual load sharing power loss associated with plural power supplies is determined and applied to allocate power to one or more information handling systems. The use of actual load sharing power loss releases excess power otherwise claimed by worst case load sharing power assumptions so that a greater portion of available power capacity is used to power the one or more information handling systems.

More specifically, an information handling system blade chassis supports plural information handling system blade processing modules with power supplied from plural power supplies under the management of a chassis manager. A power manager running on the chassis manager retrieves power information from the power supplies through a power management bus to compute an actual load sharing power loss associated with the plural power supplies. The actual load sharing power loss is used to determine the amount of power available for allocation to the information handling systems, such as by replacing an initial load sharing power loss assumption value with the actual value. Power output as a measured percentage of load for the power supplies is determined by retrieving power out values from each power supply and averaging the power out values. Actual load sharing power loss is computed by summing the difference of the largest power out value from the remaining power out values as provided by the power supplies.

The present invention provides a number of important technical advantages. One example of an important technical advantage is that measuring actual load sharing power loss with plural power supplies in a modular chassis allows a chassis management controller to assign a greater amount of power to modular information handling systems. Additional power is available from the power supplies because actual measurement of power load sharing loss reduces the amount of power set aside in a worst case power load sharing scenario. The additional power provided from measuring actual load sharing power loss helps to reduce the cost of information handling systems supported in a modular chassis by working will smaller and less expensive power supplies and also helps to ensure that information handling systems operate at full capacity or closer to full capacity than is possible with worst case load sharing power loss assumptions. For example, in one embodiment having three power supplies, the use of actual load sharing power loss provides 400 Watts of power over a worst case power loss assumption.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Applying actual load sharing power loss to allocate power to an information handling system provides more complete use of the capacity available from plural power supplies. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
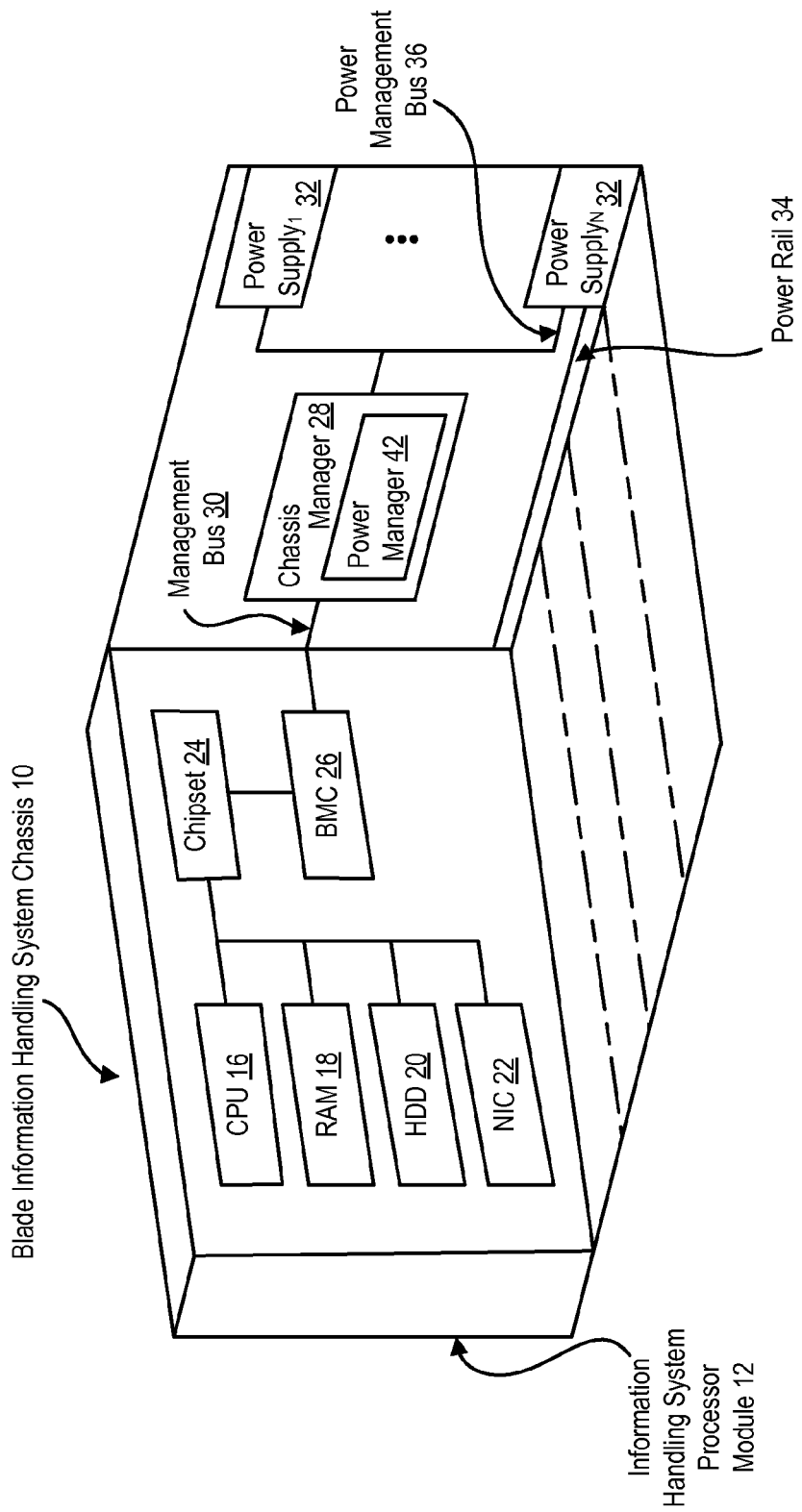
FIG. 1 depicts a block diagram of an information handling system blade chassis power allocation with actual load sharing power loss.

Referring now to FIG. 1, a block diagram depicts a system for allocation of power using actual load sharing power loss. An information handling system blade chassis 10 supports plural information handling system blade processing modules 12 in plural blades slots 14. Information handling system blade processing modules 12 are built with plural processing components that cooperate to process information, such as a CPU 16, RAM 18, hard disk drive 20, network interface card 22 and chipset 24. A baseboard management controller 26 provides out of band management of each processing module 12, such as with a chassis manager 28 that communicates over a management bus 30. Processing modules 12 receive power from plural power supplies 32 through a chassis power rail 34 under the management of chassis manager 28. The use of multiple power supplies 32 introduces a load sharing power loss so that the total power available from the multiple power supplies 32 is less than the total power available from the sum of each power supply operating individually. Chassis manager 28 includes logic that retrieves power information from power supplies 32 through a power management bus 36 and applies the power information to determine an actual load sharing power loss. The actual load sharing power loss replaces a default load sharing power loss value so that chassis manager 28 has the difference between the actual and default values for use by processing modules 12. Although FIG. 1 depicts a system for applying actual load sharing power loss for power management at a blade chassis 10 having plural blade processing modules 12, in alternative embodiments alternative types of information handling systems operating individually or in common with plural power supplies may use the power management described herein.

Figure 2:
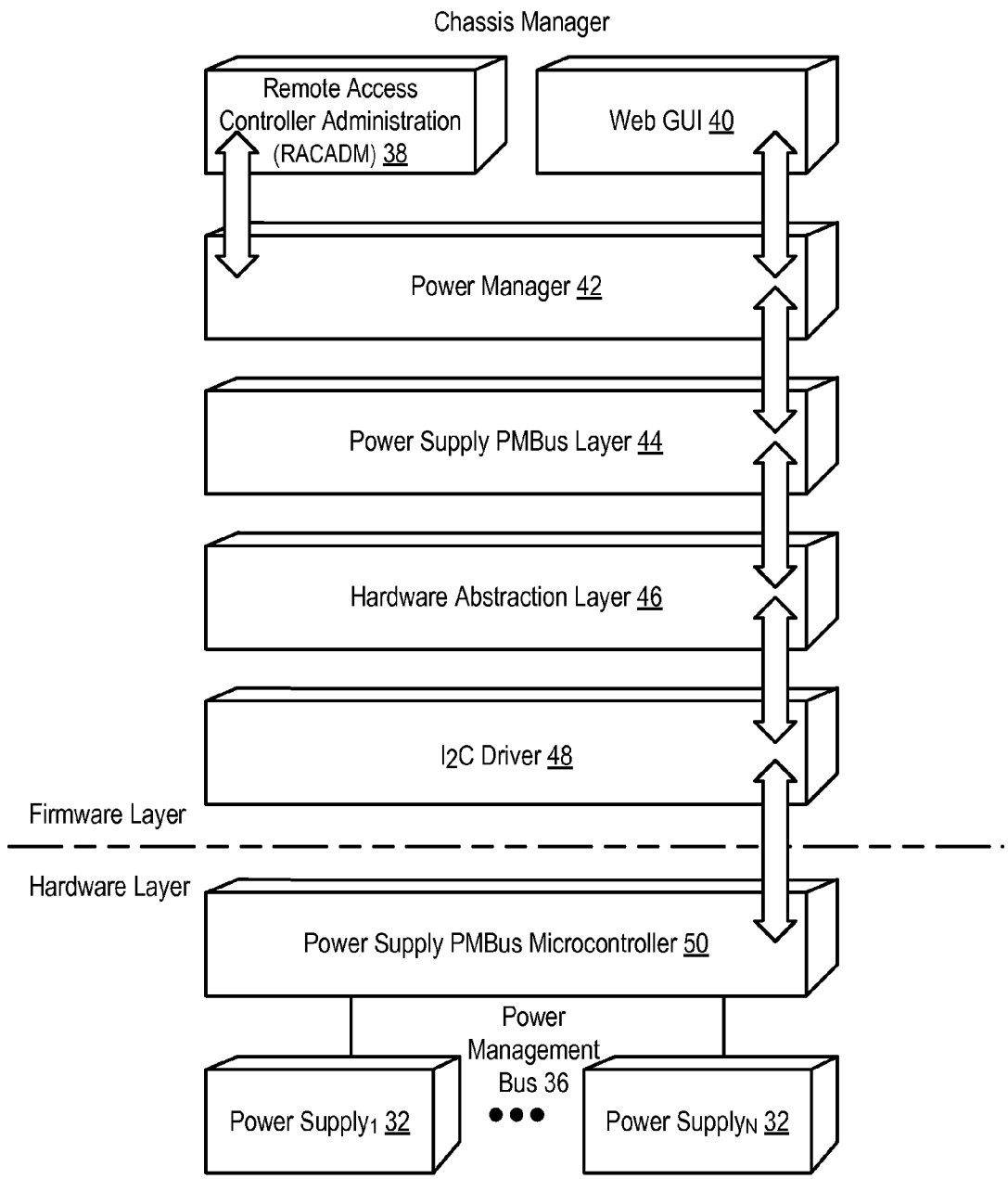
FIG. 2 depicts a block diagram of a system for allocation of power using actual load sharing power loss.

Referring now to FIG. 2, a block diagram depicts a system for allocation of power using actual load sharing power loss. An end user interacts with the system through a Remote Access Controller Administration (RACADM) 38, such as a Remote Access Controller administration interface firmware module running on chassis manager 28, or Web graphical user interface 40 to set an AC power limit in Watts that represents available external power. A power manager 42, such as a firmware module running on chassis manager 28, translates the AC power limit to create a DC power budget based on a number of factors, such as the number of power supplies present, the number of power supplies that are online and operational, a measurement of the actual load sharing power loss and the power allocated to infrastructure, such as power that runs chassis cooling and management subsystems. Power manager 42 retrieves power information from power supplies 32 through a power supply power management bus layer 44, a hardware extraction layer 46 an I2C bus driver 48 and a power supply bus microcontroller 50 that manages communication between chassis manager 28 and power supplies 32. For example, power manager 42 performs enumeration of power supplies 32 to count available and operating power supplies and their efficiencies which are published through power management bus 36. Power manager 42 determines percentage load condition ranges to compute DC power translated from available AC power. Power manager 42 measures actual load sharing power loss by profiling power out measurements retrieved from power supplies 32 against a percentage of load ranges, such as with an average computed from multiple repeated power out measurements. The profile of power out measurements is analyzed to determine an actual load sharing power loss over a range of power out values. Power manager 42 then replaces a default load sharing power loss value used to initiate the system with the actual load sharing power loss to determine the amount of power that is available for allocation to information handling system 10.

Figure 3:
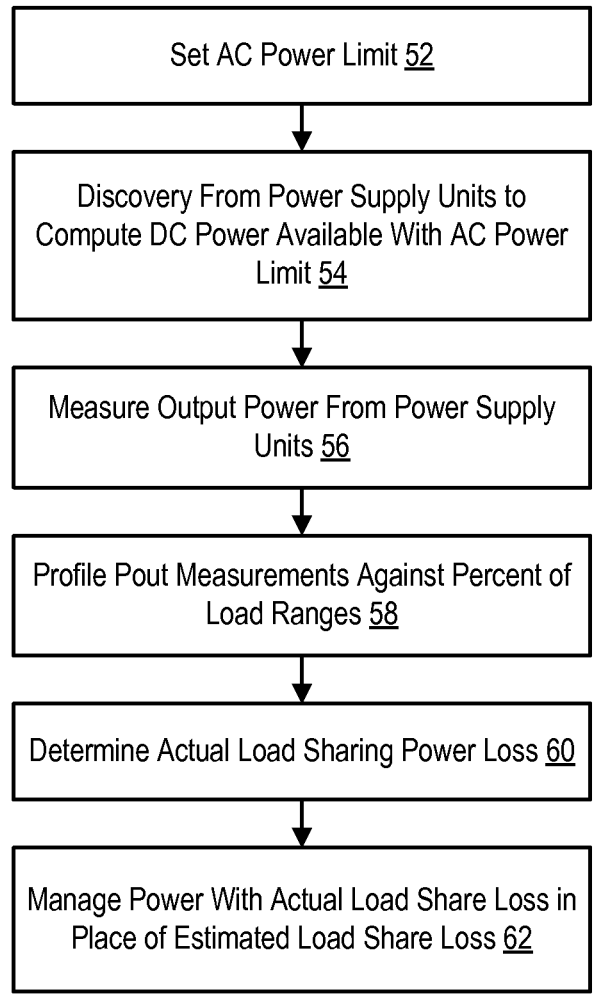
FIG. 3 depicts a flow diagram of a process for power allocation with actual load sharing power loss.
Figure 4:
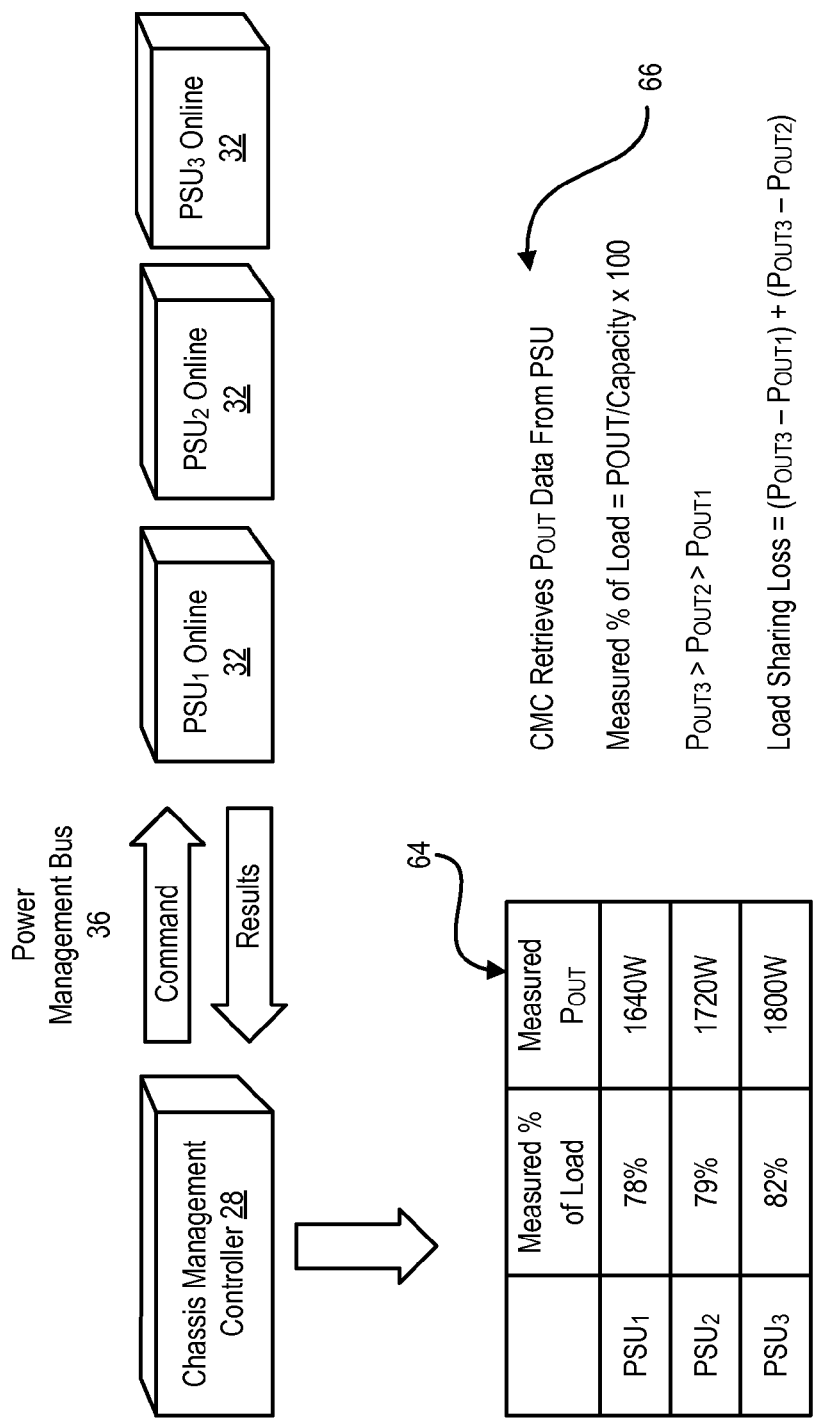
FIG. 4 depicts power allocation with an example embodiment of power supplies having a load sharing power loss.

Referring now to FIG. 3, a flow diagram depicts a process for power allocation with actual load sharing power loss. The process begins at step 52 with an AC power limit input by an end user, such as through a Web GUI or a remote interface. The process continues to step 54 for discovery from the power supply units of power information to compute available DC power based on the AC power limit and the power supply information. For example, an enumeration of the power supplies and factors in a power supply count that includes power supply efficiency provides percentage of load condition ranges to compute DC power translated from AC power. DC power available to processing modules depends upon the number of operating power supplies, their efficiency, administrative overhead and load sharing power loss, which is initially set at a default value. The process continues to step 56 to measure output power from the power supplies. A power management bus (PMBus) interface provides measurements made at each power supply for output power in Watts in response to a POUT command. At step 58, a profile table is created for POUT measurements against a percentage of load ranges. POUT readings are retrieved from each power supply in back to back power management bus transactions and repeated over n samples in rapid succession to compute an averaged POUT measurement. Power out readings taken in rapid succession at a firmware level, such as in hardware abstraction layer 46, minimize latency to provide a more accurate measure of power out. FIG. 4 depicts a block diagram of an example of a process flow of information between power supplies 32 and chassis manager 28 to create a power output table 64. For a given measured percentage of load, the actual load sharing power loss is computed by taking a sum of the differences between the greatest power out value and each other power out value, as depicted in FIG. 4 by formula 66.

Figure 5:
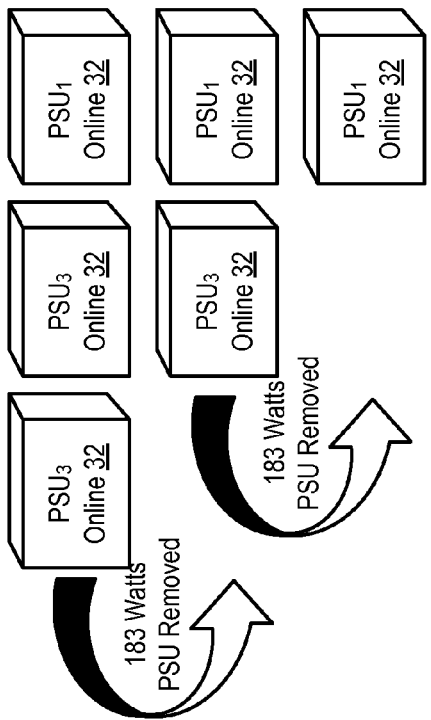
FIG. 5 depicts load sharing power loss adjustments where a power supply unit is removed from supplying power.

Returning to FIG. 3, at step 60 an actual load sharing power loss is determined based on the power out measurements. Load share loss between a pair of power supplies is constant from 20% to 100% of load so that any measurement while the power supplies are over 20% of load provides useful data. Formula 66 from FIG. 4 depicts on example of a computation of load sharing power loss. Use of formula 66 provides an actual measurement of load sharing power loss in a given power supply configuration. Load sharing power loss is computed by collecting power out readings from all power supplies for percentage of load condition samples and determining the difference from the highest reading between all other measure readings. At step 62, power allocation to the information handling system is managed with the actual load sharing power loss value in the place of any estimated load sharing power loss value, such as a default worst case value used to initialize the system. This enables allocation of additional power for use by the information handling system that was otherwise tied up in worst case load sharing power loss assumptions. FIG. 5 depicts an example of estimated load sharing power loss that is reclaimed as the number of power supplies is decreased, such as with a power supply failure. Excess load sharing power that is available as power supplies drop off line is used to increase power available for running the information handling system.

Although the present invention has been described in detail, it should be understood that various changes, substitutions and alterations can be made hereto without departing from the spirit and scope of the invention as defined by the appended claims.

What is claimed is:

1. An information handling system comprising:
a chassis;
plural power supplies associated with the chassis;
plural processing modules, each processing module having processing components operable to process information, each processing module interfaced with the power supplies to receive power;
a chassis manager associated with the chassis and interfaced with the power supplies; and
a power manager running on the chassis manager, the power manager operable to determine a load sharing power loss associated with the power supplies and to allocate power to the processing modules based at least in part on the load sharing power loss, the load sharing power loss including at least a determination of power loss due to sharing a load between the plural power supplies;
wherein the power manager determines a load sharing power loss associated with the power supplies by retrieving from the power supplies information to compute total available power.

2. The information handling system of claim 1 wherein the information to compute total available power comprises the number of power supplies and the power supply efficiency.

3. The information handling system of claim 1 further comprising a power management bus interfacing the chassis manager and the power supplies.

4. The information handling system of claim 1 wherein the power manager initiates with a default load sharing power loss and replaces the default load sharing power loss with the determined load sharing power loss.

5. The information handling system of claim 1 wherein the chassis comprises a blade information chassis having plural slots and the processing modules comprise blade information handling systems.

6. A method for allocating power to one or more information handling systems from plural power supplies, the method comprising:
retrieving from the power supplies information to determine total available power;
analyzing power output from the plural power supplies to determine an actual load sharing power loss of power lost due to sharing the power load by the plural power supplies of powering the one or more information handling systems;
applying the determined actual load sharing power loss to total available power to determine an actual total available power for allocation to the one or more information handling systems.

7. The method of claim 6 wherein the information to determine total power comprises the number of power supplies and the power supply efficiency.

8. The method of claim 6 wherein retrieving from the power supplies further comprises retrieving the information to determine total available power through a power management bus.

9. The method of claim 8 further comprising retrieving power output from the power supplies through the power management bus to determine the actual load sharing power loss.

10. A system for allocating power to one or more information handling systems, the system comprising:
plural power supplies operable to supply power and to communicate through a power management bus;
a power management bus interfaced with the power supplies; and
a power manager interfaced with the power management bus, the power manager operable to retrieve total available power information from the power supplies through the power management bus to determine a load sharing power loss and to apply the load sharing power loss to allocate power to the one or more information handling systems;

wherein the load sharing power loss comprises the power loss due to sharing power load across the plural power supplies.

11. The system of claim 10 wherein the power manager is further operable to replace a default load sharing power loss with the determined load sharing power loss.

12. The system of claim 10 wherein the power manager comprises firmware running on a chassis manager, the chassis manager operable to manage plural information handling system disposed in a common chassis.

* * * * *